| United States Patent [19] | [11] | 4,016,122 |
|---|---|---|
| Matsuda et al. | [45] | Apr. 5, 1977 |

[54] ANIONIC AQUEOUS POLYURETHANE HAVING BLOCKED NCO GROUPS AND PROCESS

[75] Inventors: Kazuo Matsuda; Hidemasa Ohmura; Takeyo Sakai, all of Wakayama, Japan

[73] Assignee: Kao Soap Co., Ltd., Tokyo, Japan

[22] Filed: July 14, 1976

[21] Appl. No.: 705,266

[30] Foreign Application Priority Data

July 31, 1975 Japan .............................. 50-93326

[52] U.S. Cl. .................... 260/29.2 TN; 260/75 NH; 260/77.5 AM; 260/77.5 TB
[51] Int. Cl.² ...................... C08G 18/80; C08J 3/06
[58] Field of Search ............ 260/29.2 TN, 29.2 EP, 260/29.2 N, 75 NH, 77.5 TB, 77.5 AM

[56] References Cited

UNITED STATES PATENTS

| 3,723,372 | 3/1973 | Wakimoto et al. | 260/29.2 TN |
|---|---|---|---|
| 3,799,854 | 3/1974 | Jerabek | 260/29.2 TN |
| 3,836,493 | 9/1974 | Matsuda et al. | 260/29.2 TN |
| 3,897,377 | 7/1975 | Broecker et al. | 260/29.2 TN |
| 3,903,031 | 9/1975 | Matsuda et al. | 260/29.2 TN |
| 3,903,032 | 9/1975 | Matsuda et al. | 260/29.2 TN |
| 3,928,271 | 12/1975 | Matsuda et al. | 260/29.2 TN |
| 3,932,561 | 1/1976 | Zamer | 260/29.2 TN |
| 3,947,338 | 3/1976 | Jerabek et al. | 260/29.2 TN |
| 3,951,897 | 4/1976 | Matsuda et al. | 260/29.2 TN |

*Primary Examiner*—Murray Tillman
*Assistant Examiner*—A. H. Koeckert
*Attorney, Agent, or Firm*—Woodhams, Blanchard and Flynn

[57] ABSTRACT

An aqueous anionic polyurethane emulsion is prepared by reacting an isocyanate-terminated urethane prepolymer with an excess of a polyalkylene polyamine thereby to form a polyurethane-urea-polyamine, reacting a portion of the free amino groups of said polyurethane-urea-polyamine with a blocked polyisocyanate having a single free isocyanate group, reacting the resulting product with a cyclic dicarboxylic acid anhydride, and mixing the resulting product with an aqueous solution of a basic substance.

8 Claims, No Drawings

ANIONIC AQUEOUS POLYURETHANE HAVING BLOCKED NCO GROUPS AND PROCESS

BACKGROUND OF THE INVENTION

1. Field of the Invention

This invention relates to a process for preparing an aqueous polyurethane emulsion and, more particularly, to a process for preparing a homogeneous, stable, anionic, self-emulsified, aqueous, polyurethane emulsion.

2. Description of the Prior Art

There have been known in the art various processes for the preparation of aqueous polyurethane emulsions. For example, a typical prior art process comprises reacting a polyhydroxyl compound with an excess of an organic polyisocyanate so as to form an isocyanate-terminated urethane prepolymer, subjecting the resulting urethane prepolymer to chain-extension using a chain extender having a tertiary amino group thereby to obtain a polyurethane composition having a tertiary amino group, quaternizing the amino group of the resulting composition and thereafter mixing the resulting product with water or an aqueous solution of an acid so as thereby to form a so-called "self-emulsifiable" polyurethane composition which does not contain an emulsifier.

According to another typical conventional process, a polyurethane emulsion is obtained by dispersing a polyurethane composition in water, in the presence of an emulsifier.

Polyurethane resins in general have excellent physical as well as chemical properties. However, the physical and chemical properties of films of the polyurethane resin prepared from the polyurethane emulsions obtained by the abovementioned known processes are far inferior in comparison with cross-linked polyurethane resin films. This is partly because it is not easy to introduce chemical cross-linkages into the polymer and partly because the emulsifier tends to remain in the polyurethane resin.

When a polyurethane polymer has strong cross-linkages, handling of the polymer in the production procedures has generally been difficult, and almost impossible in most cases, due to the poor melting and poor solubility properties of the polymer. In consequence, it is almost impossible to prepare an emulsion by dispersing such a polymer in water. Even if the polyurethane can be dispersed in water, the resulting polyurethane emulsion is extremely unstable.

SUMMARY OF THE INVENTION

We have discovered a process for preparing an aqueous emulsion containing a polyurethane resin having excellent physical and chemical properties without introducing cross-linkages into the urethane resin prior to the dispersion of said resin in water, without increasing the molecular weight of the polymer to such an extent as to cause lowering of the stability of the emulsion and without causing a detrimental effect on the other desirable properties of the urethane resin owing to the use of a large amount of an emulsifier. As a result, the inventors of the present invention have succeeded in obtaining an anionic self-emulsified polyurethane emulsion having a functional group which is capable of forming cross-linkages.

We have discovered a process for introducing an isocyanate-generating moiety (i.e., a blocked isocyanate) known as an effective reactive functional group which is capable of forming cross-linkages upon heat treatment, into a polyurethane resin existing in the state of an aqueous emulsion. The inventors have also confirmed that such a process is indeed effective.

More specifically, the inventors have succeeded in preparing a stable, anionic, self-emulsified and self-crosslinkable emulsion containing a polyurethane resin having excellent physical and chemical properties by a process which comprises the steps of, first, reacting (A) an isocyanate-terminated urethane prepolymer which is prepared by the reaction between a polyhydroxyl compound and an excess of an organic polyisocyanate, with (B) an excess of a polyalkylene polyamine, so as thereby to form a polyurethane-urea-polyamine; then reacting a portion of the free amino groups contained in the resulting polyurethane-ureapolyamine with a blocked polyisocyanate having one free isocyanate group; then reacting the reaction product thus formed with a cyclic dicarboxylic acid anhydride; and finally mixing the reaction product with an aqueous solution of a basic substance.

Drying of the polyurethane emulsion obtained in accordance with the present invention affords a polyurethane resin which, upon heat-treatment, undergoes a heat-setting reaction and forms cross-linkages, thus resulting in a major improvement in the properties of the polymer. For this reason, it is not necessary to make the molecular weight of the polymer in the emulsion excessively high in advance for the purpose of improving the properties. In other words, the emulsion in accordance with the present invention has an extremely good stability.

The polyurethane-urea-polyamine used for the preparation of the present composition can be synthesized by the reaction, preferably in a solvent of the ketone-type, between a polyalkylene polyamine and an isocyanate-terminated urethane prepolymer formed from a polyhydroxyl compound and an excess of a polyfunctional organic isocyanate.

Specific examples of the polyfunctional organic isocyanates used for the above-mentioned purpose include aromatic and aliphatic diisocyanates such as, for example, 1,5-naphthylene diisocyanate, 4,4'-diphenylmethane diisocyanate, 4,4'-diphenyldimethylmethane diisocyanate, di- and tetra-alkyl diphenylmethane diisocyanates, 4,4'-dibenzyl isocyanate, 1,3-phenylene diisocyanate, 1,4-phenylene diisocyanate, tolylene diisocyanate, chlorinated isocyanates, brominated isocyanates, phosphorous-containing isocyanates, butane-1,4-diisocyanate, hexane-1,6-diisocyanate, dicyclohexylmethane diisocyanate, cyclohexane-1,4-diisocyanate, xylylene diisocyanate lysine diisocyanate and the like.

In addition to the above-mentioned diisocyanates, triisocyanates such as 1-methyl-benzole-2,4,6-triisocyanate, biphenyl-2,4,4'-triisocyanate, triphenylmethane triisocyanate and the like can be used in combination with the foregoing diisocyanates.

The polyhydroxyl compound used for the preparation of the urethane prepolymer employed in the present invention generally has a molecular weight of 200 to 10,000. Those known polyhydroxyl compounds which are generally used for preparing polyurethanes can be used for this purpose. Examples of the polyhydroxyl compound are polyethers, polyester amides, polyacetals, polythioethers, polybutadiene glycols and so forth.

As specific examples of the polyethers useful as the above-mentioned polyhdroxyl compounds, mention can be made of polymers, or copolymers, or graft copolymers of tetrahydrofuran, ethylene oxide, propylene oxide, butylene oxide and the like.

Similarly, homogeneous or mixed polyethers can be used for this purpose and these polyethers are obtained by the condensation of hexanediol, methylhexanediol, heptanediol, octanediol and the like.

Further, propoxylated or ethoxylated glycols can be used. In addition, glycols such as bisphenol A or those glycols which are obtained by adding alkylene oxides such as ethylene oxide or propylene oxide to bisphenol A can also be used.

It is preferred to use thioglycol alone or thioglycol in combination with other glycol as examples of the polytioethers.

Examples of the polyacetals are water-insoluble polyacetals such as those obtained from hexanediol and formaldehyde, or from 4,4'-dioxyethoxydiphenyl dimethyl methane and formaldehyde.

Examples of the afore-mentioned polyesters are those polyester glycols which are obtained by the dehydrocondensation reaction between dibasic acids and saturated or unsaturated low molecular weight glycols such as ethylene glycol, propylene glycol, 1,3-butane diol, 1,4-butane diol, neopentyl glycol, pentanediol, hexanediol, octanediol, 2-ethyl-1,3-hexanediol, 1,4-butynediol, bisphenol A, diethylene glycol, triethylene glycol, dipropylene glycol, and glycols that are obtained by adding alkylene oxides such as ethylene oxide or propylene oxide to bisphenol A, and those polyester glycols that are obtained by the ring-opening polymerization of cyclic ester compounds.

If required, ordinary glycols such as ethylene glycol, diethylene glycol, triethylene glycol, butanediol, propanediol, 1,6-hexanediol, neopentyl glycol and N-alkyldiethanol amines containing an alkyl group having 1 to 22 carbon atoms can be used in combination with the afore-mentioned polyhydroxyl compounds.

The preparation of the isocyanate-terminated urethane prepolymer used in the present invention is performed in the presence or absence of a solvent. When an aromatic polyisocyanate is used in combination with the polyhydroxyl compound, the reaction temperature is in the range of 50° to 100° C. When an aliphatic or alicyclic polyisocyanate is used, on the other hand, the reaction temperature is in the range of 70° to 130° C.

In preparing the above-mentioned urethane prepolymer, the amount of the polyisocyanate is selected so that all of the hydroxyl groups are completely reacted with the isocyanate groups. In other words, it is preferred that the ratio of the total number of the isocyanate groups to the total number of the reactive hydrogen atoms (OH groups) is in the range of 1.1 : 1.0 to 5.0 : 1.0.

Various polyalkylene polyamines can be used in the present invention such as polyethylene polyamine, polypropylene polyamine, polybutylene polyamine and the like.

More specifically, the polyalkylene polyamines used in the present invention are those wherein the nitrogen atoms are bonded to one another by means of groups having the formual —$C_nH_{2n}$— (wherein $n$ is an integer larger than 1) and they contain 2 to 4 of these groups in one molecule thereof. The above-mentioned nitrogen atoms can be bonded to the adjacent carbon atoms in the groups —$C_nH_{2n}$— but no two nitrogen atoms are bonded to the same carbon atoms.

That is to say, the above-mentioned polyalkylene polyamines have the formula:

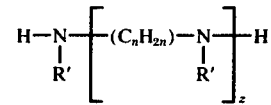

wherein $n$ is an integer larger than 1; z is an integer of from 2 to 4, and R', which can be the same or different, is hydrogen, or alkyl having one to 4 carbon atoms or hydroxyalkyl having 1 to 4 carbon atoms.

More specifically, in addition to specific examples of the polyamines such as diethylene triamine, triethylene tetramine, tetraethylene pentamine and dipropylene triamine, mixtures of the polyamines and various crude polyamines can be used in the present invention.

Likewise hydroxylalkyl-substituted polyamines may be used in the present invention.

In some cases, in order to change the density of the hydrophilic group contained in the polyurethane emulsion obtained in accordance with the present invention or to improve the properties of the polyurethane resin, it is desired to increase the distance between the amino groups in the molecules of the polyurethane-urea-polyamine. The abovementioned object can be accomplished by replacing a part of the polyalkylene polyamine by hydrazine, ethylene diamine, propylene diamine, hexamethylene diamine, piperazine, phenylene diamine, alkyl ($C_1$ to $C_{12}$) substituted diamines or alkylene oxide adducts, acrylonitrile adducts or acrylate adducts of these diamines.

The above object can be accomplished by replacing up to less than about 50 wt.% of the polyalkylene polyamines by the afore-mentioned diamines.

In the present invention, it is preferred to carry out the reaction between the isocyanate-terminated urethane prepolymer and the polyalkylene polyamine, under atmospheric pressure, at a reaction temperature of −20° C up to 70° C, in a solvent of the ketone-type.

Examples of the ketone-type solvent are acetone, methylethyl ketone, diethyl ketone, dipropyl ketone, methylisobutyl ketone and methylisopropyl ketone. The preferred solvents are acetone and methylethyl ketone.

There can be used in combination with the above-mentioned ketone-type solvent, other solvents such as benzene, tetrahydrofuran, dioxane, acetic acid esters, dimethyl formamide and chlorinated hydrocarbon solvents.

The reaction time is determined depending upon the reaction temperature and the reactivity of the polyisocyanate compound used. In other words, a shorter or a longer reaction period is employed depending upon the reaction conditions. The reaction is continued until the absorption assigned to the isocyanate group at 2250 $cm^{-1}$ is no longer observed in the infrared absorption spectrum of the reaction mixture. Usually, the reaction time is from 0.5 to 2 hours.

In the reaction between the urethane prepolymer and the polyalkylene polyamine in accordance with the present invention, it is essentially required that the number of the primary and secondary amino groups exceeds the total number of the isocyanate groups in the urethane prepolymer. The closer is the total molar number of the amino groups to that of the isocyanate groups, the larger is the molecular weight of the resulting polyurethane-urea-polyamine. In this case, however, the reaction product is often obtained in gel form or it exhibits a remarkable tendency to gel.

On the other hand, if the ratio of the number of moles of the amino groups is made excessively large in comparison to that of the isocyanate group, there is often obtained a polyurethane-urea-polyamine having an unacceptably low molecular weight. If a polyurethane emulsion is prepared using such a low molecular weight product as the intermediate, the resin does possess satisfactory properties.

For the reasons noted above, the ratio of the total number of moles of the primary and secondary amino groups (B) to that of the isocyanate groups (A) is in the range of $1 < B/A \leq 5$, preferably $1 < (B/A) < 3$. The molecular weight of the polyurethane-urea-polyamine is preferably in the range of 5,000 to 100,000.

Using the polyurethane-urea-polyamine prepared by the above procedure as the intermediate, there can be obtained the polyurethane emulsion of the present invention. In order to provide the urethane resin in the polyurethane emulsion with self-crosslinkability, a blocked polyisocyanate is reacted with the free amino groups contained in the abovementioned intermediate. This blocked polyisocyanate can be prepared by reaction of polyisocyanates with various blocking agents for polyisocyanates. As the polyisocyanates for this purpose, there can be used suitably the afore-mentioned isocyanate-terminated urethane prepolymer of those polyisocyanates which have already been mentioned as the starting compound for the preparation of said urethane prepolymer.

As typical examples of the above-mentioned isocyanate blocking agent, mention can be made of sulfites such as potassium hydrogen sulfite, sodium hydrogen sulfite, etc.; secondary amines such as diethylamine, dibutylamine, diphenylamine, butyl phenylamine, phenyl naphthylamine, etc.; tertiary alcohols such as tertiary butyl alcohol; amides such as stearic acid amide, acetic acid amide, acrylamide, acetanilide; phenol derivatives such as ethyl phenol, tertiary phenol, hydroxybenzoic acid, etc.; lactams such as ε-caprolactam, δ-valerolactam, γ-butyrolactam, β-propiolactam, etc.; oximes such as methyl ethyl ketoxime, benzophenone oxime, cyclohexanone oxime, acetaldoxime, acetoxime, etc.; imides such as maleic acid imide, succinic acid imide, phthalic acid imide, etc.; mercaptans such as tertiary-dodecyl mercaptan, tertiary-butyl mercaptan, butyl mercaptan, hexyl mercaptan, etc.; active methylene compounds such as dimethyl malonate, diethyl malonate, methyl acetacetate, ethyl acetacetate, acetyl acetone, etc.; hydrogen cyanide, ethylene imine, glycidol, hydroxyl amine, pyrrolidone and the like.

The reaction between the polyisocyanate and the isocyanate blocking agent is carried out usually, in the presence or absence of a solvent, at a temperature of 20° to 150° C for 0.5 to 7 hours. It is important to select the amount of the blocking agent such that one isocyanate group in one molecule of the polyisocyanate is left unreacted during the reaction. That is to say, a blocked polyisocyanate having one free isocyanate group can easily be prepared by reacting one mole of the polyisocyanate having P number of free isocyanate groups in one molecule thereof, with about $(P - 1)$ mole(s) of the isocyanate blocking agent.

The thus-prepared blocked polyisocyanate having one free isocyanate group is then reacted with the free amino groups of the polyurethane-urea-polyamine. The reaction conditions for this purpose are a temperature of −20° to 70° C, for 0.5 to 2 hours. The amount of said blocked polyisocyanate is in the range of from 0.1 to 0.7 moles of free isocyanate group is said blocked polyisocyante, per one mole of the primary and secondary amino groups in said polyurethane-urea-polyamine.

The thus-prepared polyurethane-urea-polyamine having the blocked isocyanate group is reacted with a cyclic dicarboxylic acid anhydride, and that reaction product is admixed with an aqueous solution of a basic substance thereby to provide an anionic self-emulsifiable emulsion. The organic solvent used for this reaction can be distilled away by heating, and the distillation of the solvent never affects adversely the stability of the emulsion.

Examples of the cyclic dicarboxylic acid anhydride used in the present invention are maleic anhydride, succinic anhydride, phthalic anhydride, dihydrophthalic anhydride, tetrahydrophthalic anhydride, hexahydrophthalic anhydride, trimellitic anhydride and itaconic anhydride. Generally the cyclic dicarboxylic acid anhydride is reacted in an equimolar amount, based on the amino groups contained in the polyurethane-urea-polyamine having the blocked isocyanate group, at a temperature of 5° to 70° C for a period of 0.5 to 2 hours.

Examples of the aqueous solutions of a basic substance used in the present invention are aqueous solutions of hydroxides, carbonates or bicarbonates of alkali metals such as, for example, sodium hydroxide, potassium hydroxide, lithium hydroxide, sodium carbonate, sodium bicarbonate, potassium bicarbonate, etc., aqueous solutions of ammonia and lower amines expressed by the following formulas $$RNH_2, R_2NH \text{ and } R_3N$$

wherein R is a member selected from the group consisting of alkyl of 1 to 4 carbon atoms, a hydroxyethyl group and a hydroxypropyl group.

The above-mentioned basic substance is used in such an amount that pH of the resulting polyurethane emulsion is in the range from about 6 to 9.

Drying of the polyurethane emulsion obtained in accordance with the present invention provides a urethane resin which, when heated to a temperature of 50° to 200° C, causes regeneration of the isocyanate group from the blocked isocyanate group. The isocyanate group so regenerated in turn reactes with the amide group, urethane and urea linkages and thus forms cross-linkages, thereby to remarkably improve the properties of the urethane resin.

The self-emulsified and self-crosslinkable emulsion of the present invention contains generally 5 to 50 wt.% of the polyurethane resin formed in the above-mentioned procedures. The emulsion can be used for the purpose of improving properties such as surface coating, adhesion, feel and the like of various articles including fibers, non-woven fabric, paper, leather, rubber, wood, metal, concrete, gypsum, glass, glass fiber, plastic and so forth by impregnating the emulsion into these articles, or coating or spraying the emulsion onto the surfaces of these articles and then drying the same.

The emulsion of the present invention can also be used in the field of civil engineering and as an adhesive.

The polyurethane emulsion obtained by the process of the present invention is a so-called self-emulsified type which need not contain an emulsifier therein. Needless to say, however, a known emulsifier can also be incorporated in the present emulsion in order to improve further the stability thereof in such an amount as not to drastically change the properties of the polyurethane resin.

The present invention will be further described with reference to the following illustrative Examples, which are however purely illustrative and do not limit the scope of the invention in any manner.

The terms "part" and "percentage" used in the Examples are on a weight basis, unless specified otherwise.

EXAMPLE 1

A. 174 parts of an 80 : 20 mixture of 2,4-tolylene diisocyanate and 2,6-tolylene diisocyanate and 174 parts of methylethyl ketone were charged into a flask and then 348 parts of methylethyl ketone solution containing dissolved therein 87 parts of methylethyl ketoxime, was added dropwise from a dropping funnel over a period of 30 minutes.

The addition was initiated at a temperature of 17° C, and the temperature of the reaction mixture rose to 35° C at the end of the addition.

After 522 parts of methyl ethyl ketone was further added, the reaction mixture was reacted at 50° C for 30 minutes. Thus, there was obtained a methyl ethyl ketone solution of a blocked isocyanate compound having one free isocyanate group per one molecule thereof. This solution had a free isocyanate group content of 3.20%.

B. 202.5 Parts of poly(ethylene adipate)glycol having a OH value of 55.4, that had been dehydrated under reduced pressure at 90° C for 2 hours in a stream of nitrogen, was dissolved in 101.7 parts of methylethyl ketone and charged into a flask, and then 34.8 parts of an 80 : 20 mixture of 2,4-tolylene diisocyanate and 2,6-tolylene diisocyanate were added and reacted at 80° C for 3 hours. Thus, there was obtained a solution of a urethane prepolymer solution containing 2.45% of free isocyanate groups.

Separately, 3.53 parts of diethylene triamine and 200 parts of methylethyl ketone were charged into another flask and were admixed. To this mixture was added 100 parts of the above-mentioned urethane prepolymer solution dropwise over a period of about 20 minutes. During this time, the temperature of the reaction mixture rose from 21° to 26° C. The mixture was then reacted at 50° C for 30 minutes thereby to yield a methylethyl ketone solution of a polyurethane-urea-polyamine.

23.3 parts of the solution of the blocked isocyanate compound prepared in the above-mentioned step (A) was added to this polyurethane-urea-polyamine solution and reacted at 50° C for 30 minutes. After the reaction mixture was cooled to 20° C, 2.89 parts of maleic anhydride dissolved in 30 parts of methylethyl ketone was added. Thereafter, the mixture was again reacted at 50° C for 30 minutes. Next, 1.18 parts of sodium hydroxide dissolved in 350 parts of ion-exchanged water was then added to the above-mentioned reaction mixture, followed by homogeneous admixing. The organic solvent was then distilled off under reduced pressure at 40° – 50° C.

The concentration of the solids was adjusted by adding water, thus yielding a homogeneous low-viscosity emulsion having a resin content of 20%.

The resulting emulsion was spread over a flat surface of a Teflon plate and then air-dried thereby to obtain a uniform and soft rubbery film. Upon heat-treatment at 120° C for 20 minutes, the film had the following mechanical properties:

| 100% modulus | Tensile strength | Elongation |
| --- | --- | --- |
| 31 kg/cm² | 267 kg/cm² | 610% |

COMPARATIVE EXAMPLE 1

To the methylethyl ketone solution of the polyurethane-urea-polyamine prepared in the same way as in step (B) of Example 1 there was added a solution of 4.81 parts of maleic anhydride dissolved in 50 parts of methylethyl ketone and the mixture was reacted at 50° C for 30 minutes. 1.96 parts of sodium hydroxide dissolved in 340 parts of ion-exchanged water was then added to the above-mentioned reaction mixture, followed by homogeneous admixing.

Next, the organic solvent was distilled off in the same way as in Example 1 thereby to yield an emulsion having a resin content of 20%.

The film prepared from this emulsion in the same way as described in Example 1 had the following mechanical properties:

| 100% modulus | Tensile strength | Elongation |
| --- | --- | --- |
| 24 kg/cm² | 211 kg/cm² | 690% |

Comparison of Example 1 with Comparative Example 1 illustrates clearly that the polymer film obtained by the former (method of the present invention) had beeter mechanical properties than the film obtained by the latter.

Additionally, the heat-treated film of Example 1 swelled in dimethyl formamide but did not dissolve therein whereas the film of Comparative Example 1 dissolved in dimethyl formamide.

EXAMPLE 2

A. 17.4 parts of an 80 : 20 mixture of 2,4-tolylene diisocyanate and 2,6-tolylene diisocyanate were charged into a round bottom flask. To the flask were added 148.4 parts of methylethyl ketone containing dissolved therein 19.7 parts of benzophenone oxime, dropwise, over a period of 25 minutes. The mixture was then reacted at 50° C for four hours with agitation thereby to give a methylethyl ketone solution of a blocked isocyanate compound having one free isocyanate group in one molecule thereof. This solution had a free isocyanate group content of 2.26%.

B. 101.7 parts of dehydrated polytetramethylene ether glycol (OH. V. = 55.2) was dissolved in 54.3 parts of methylethyl ketone and then charged into a round bottom flask. 25 parts of diphenylmethane-4,4′-diisocyanate was added, the mixture was reacted at 75°

C for 2.5 hours thereby to yield a urethane prepolymer solution containing 2.32% of free isocyanate groups.

C. 5.02 parts of diethylenetriamine was dissolved in 300 parts of methylethyl ketone and was charged into another flask. To this solution was added dropwise 150 parts of the urethane prepolymer solution obtained by the above-mentioned step (B) over a period of 30 minutes and reacted at 50° C for 40 minutes thereby to yield a methylethyl ketone solution of a polyurethane-urea-polyamine.

Next, 23.5 parts of the solution of the blocked isocyanate compound obtained by the above-mentioned step (A) was added to this polyurethane-urea-polyamine solution and reaced at 50° C, for 35 minutes. Subsequently a solution of 5.07 parts of succinic anhydride dissolved in 51 parts of methylethyl ketone was added to the above-mentioned reaction mixture for the reaction at 50° C for 30 minutes.

To the reaction mixture were added 6.34 parts of aqueous ammonia having a concentration of 28% and 390 parts of water. Under reduced pressure, methylethyl ketone was distilled away, whereupon the concentration of the solids was adjusted by the addition thereto of water thereby to yield a stable and homogeneous emulsion having a pH of 7.5 and a resin content of 25%.

In the same way as in Example 1, a film was prepared from this emulsion and it had the following mechanical properties:

| 100% modulus | Tensile strength | Elongation |
|---|---|---|
| 33 kg/cm$^2$ | 297 kg/cm$^2$ | 620% |

COMPARATIVE EXAMPLE 2

6.34 parts of succinic anhydride was dissolved in 65 parts of methylethyl ketone and was added to 455 parts of the methylethyl ketone solution of the polyurethane-urea-polyamine prepared in the same way as described in (B) of Example 2 and reacted at 50° C for 30 minutes. 7.93 parts of aqueous ammonia having a concentration of 28% and 380 parts of water were added to the reaction mixture. Under reduced pressure methylethyl ketone was distilled away. The concentration of the residue was adjusted by the addition thereto of water thereby to yield a homogeneous emulsion having a resin content of 25%.

In the same way as in Example 1, a film was prepared from this emulsion and it had the following mechanical properties:

| 100% modulus | Tensile strength | Elongation |
|---|---|---|
| 27 kg/cm$^2$ | 236 kg/cm$^2$ | 650% |

EXAMPLE 3

A. 147.9 parts of an 80 : 20 mixture of 2,4-tolylene diisocyanate and 2,6-tolylene diisocyanate was charged into a flask. 453 parts of methylethyl ketone having dissolved therein 96.05 parts of ε-caprolactam was added to the mixture and reacted at 70° C for one hour with agitation thereby to yield a methylethyl ketone solution of a blocked isocyanate compound having one free isocyanate group in one molecule thereof.

This solution had a free isocyanate group content of 5.16%.

B. 153.5 parts of polyoxypropylene glycol (having a OH value of 73.1) and 33.6 parts of 1,6-hexamethylene diisocyanate were charged into another flask and reacted at 90° C for four hours thereby to yield a urethane prepolymer having an issocyanate group content of 4.49%. Since the compound thus formed was highly viscous at room temperature, 150 parts of the urethane prepolymer was diluted with 60 parts of benzene to convert it into a low viscosity solution.

Separately 13.77 parts of triethylene tetramine and 300 parts of tertiary butanol were charged into a separate flask, to which there was added 210 parts of the abovementioned urethane prepolymer solution, dropwise, from a dropping funnel, over a period of 20 minutes. Thereafter the mixture was reacted at 50° C for 30 minutes. After the reaction, the reaction mixture was cooled down to room temperature.

To the polyurethane-urea-polyamine solution thus formed was added 88.9 parts of the methylethyl ketone solution of the blocked isocyanate compound obtained by the abovementioned step (A) and reacted at 50° C for 30 minutes.

Next, 10.6 parts of maleic anhydride dissolved in 106 parts of a tertiary butanol was added to the reaction mixture and then reacted again at 50° C for 30 minutes. After the reaction, 4.34 parts of sodium hydroxide dissolved in 510 parts of water was added to the reaction mixture to make the pH of the system to be about 7.5.

In the same way as described in Example 1, the organic solvent was distilled off from the system thereby to yield a homogeneous and stable emulsion having a resin content of 30%.

In the same way as described in Example 1, a film was prepared from this emulsion and it had the following mechanical properties:

| 100% modulus | Tensile strength | Elongation |
|---|---|---|
| 19 kg/cm$^2$ | 161 kg/cm$^2$ | 760% |

COMPARATIVE EXAMPLE 3

21.3 parts of maleic anhydride was dissolved in 213 parts of tertiary butanol and was added to 523.8 parts of the polyurethane-urea-polyamine solution prepared in the same way as described in Example 3 and reacted at 50° C for 30 minutes. After the reaction, 8.68 parts of sodium hydroxide dissolved in 480 parts of water and was then added to the reaction mixture, followed by homogeneous mixing. Subsequently the organic solvent was distilled off in the same way as in Example 1.

The emulsion thus formed had a resin content of 30% and was homogeneous.

In the same way as described in Example 1, a film was prepared from this emulsion and it had the following mechanical properties:

| 100% modulus | Tensile strength | Elongation |
| --- | --- | --- |
| 14 kg/cm² | 108 kg/cm² | 880% |

EXAMPLE 4

A. 17.4 parts of an 80 : 20 mixture of 2,4-tolylene diisocyanate and 2,6-tolylene diisocyanate and 98.6 parts of methylethyl ketone were charged into a round bottom flask. 7.3 parts of diethylamine dissolved in 41.4 parts of methylethyl ketone was added dropwise to the mixture over a period of about 20 minutes with cooling with ice to 0° – 10° C and thereafter was reacted at 50° C for 10 minutes thereby to yield a solution of a blocked isocyanate compound having a free isocyanate group content of 2.55%.

B. 101.6 parts of dehydrated polytetramethylene ether glycol (having a hydroxyl value of 55.2) and 51.0 parts of methylethyl ketone were charged into another flask. 17.4 parts of an 80 : 20 mixture of 2,4-tolylene diisocyanate and 2,6-tolylene diisocyanate was added to the mixture and reacted at 70° C for four hours thereby to yield a urethane prepolymer solution having a free isocyanate group content of 2.45%.

Separately, 5.3 parts of diethylene triamine and 300 parts of methylethyl ketone were charged into a separate flask. After 150 parts of the urethane prepolymer solution obtained by the above-mentioned step (B) was added dropwise to the mixture over a period of about 20 minutes, the mixture was reacted at 50° C for 40 minutes thereby to yield a polyurethane-urea-polyamine solution.

To the polyurethane-urea-polyamine solution thus prepared was added 22.0 parts of the solution of the blocked isocyanate compound obtained by the step (A) at room temperature (of about 20° C) over a period of 10 minutes and then reacted at 50° C for 20 minutes.

4.59 parts of maleic anhydride dissolved in 46 parts of methylethyl ketone, was then added to the above-mentioned polymer solution and reacted at 50° C for 30 minutes. The pH of the reaction system was adjusted to 7.5 by the addition of 500 parts of water having dissolved therein 1.87 parts of caustic soda.

Under reduced pressure, the organic solvent was distilled off from the system thereby to yield a homogeneous and stable emulsion having a resin content of 20% and a low viscosity.

In the same way as described in Example 1, a urethane film was prepared from this emulsion and it had the following mechanical properties:

| 100% modulus | Tensile strength | Elongation |
| --- | --- | --- |
| 30 kg/cm² | 271 kg/cm² | 700% |

COMPARATIVE EXAMPLE 4

6.55 parts of maleic anhydride dissolved in 66 parts of methylethyl ketone was added at room temperature to 455.3 parts of the polyurethane-urea-polyamine solution prepared in the same way as in Example 4 and reacted at 50° C for 30 minutes.

2.68 parts of caustic soda dissolved in 500 parts of water, was added to the abovementioned reaction mixture and admixed homogeneously. Under reduced pressure the organic solvent was distilled off from the reaction mixture thereby to obtain homogeneous emulsion having a resin content of 20%.

In the same way as described in Example 1, a urethane film was prepared from this emulsion and it had the following mechanical properties:

| 100% modulus | Tensile strength | Elongation |
| --- | --- | --- |
| 20 kg/cm² | 209 kg/cm² | 730% |

EXAMPLE 5

226.7 parts of dried poly(butylene adipate)glycol having a hydroxyl value of 49.5 and 112.1 parts of benzene were charged into a flask equipped with a thermometer and a stirrer. 34.8 parts of an 80 : 20 mixture of 2,4-tolylene diisocyanate and 2,6-tolylene diisocyanate were added to the flask and reacted at 70° C for 2 hours thereby to yield a urethane prepolymer solution containing 2.18% of free isocyanate groups.

Separately 4.72 parts of diethylene triamine and 300 parts of acetone were charged into another flask to which 150 parts of the above-mentioned urethane prepolymer solution was added dropwise from a dropping funnel over a period of 30 minutes.

During the addition, the temperature of the reaction mixture rose from 23° to 27° C. The reaction was further carried out by heating to 50° C for 30 minutes thereby to yield a polyurethane-urea-polyamine solution.

The infrared absorption spectrum was measured using a droplet of this solution, but the absorption assigned to the free isocyanate group at 2250 cm⁻¹ was not observed.

31.1 parts of the solution of the blocked isocyanate compound obtained by the step (A) of Example 1 was added to 454.7 parts of this polyurethane-urea-polyamine solution and reacted at 50° C for 30 minutes. Further, 3.50 parts of maleic anhydride dissolved in 35 parts of acetone was added to the reaction mixture for reaction at 50° C for 30 minutes.

Next, 4.47 parts of aqueous ammonia having a concentration of 28% and 300 parts of water were added to the reaction mixture. Distillation of the organic solvent under reduced pressure yielded a homogeneous and stable emulsion having a resin content of 30%.

In the same way as described in Example 1, a urethane film was prepared from this emulsion and it had the following mechanical properties:

| 100% modulus | Tensile strength | Elongation |
| --- | --- | --- |
| 34 kg/cm² | 259 kg/cm² | 640% |

EXAMPLE 6

A. 339 parts of the urethane prepolymer solution prepared in the same way as described in step (B) of Example 1 was charged into a round bottom flask. 26.1 parts of methylethyl ketoxime was dissolved in 951.9 parts of methylethyl ketone and then added to this urethane prepolymer solution and the mixture was reacted at 50° C for 3.5 hours thereby to yield a solution of a blocked isocyanate compound having a free isocyanate group content of 0.32%.

B. Separately, 303.5 parts of the polyurethane-urea-polyamine solution prepared in the same way as described in step (B) of Example 1 was charged into a separate flask and to it was added 88.1 parts of the solution of the blocked isocyanate compound prepared in the above-mentioned step (A) and the mixture was reacted at 50° C for 45 minutes.

5.61 parts of phthalic anhydride was dissolved in 56 parts of methylethyl ketone and was added to the reaction mixture for reaction at 45° C for 50 minutes. Then 1.52 parts of sodium hydroxide and 410 parts of water were added to the reaction mixture. Thereafter the organic solvent was distilled off under reduced pressure.

Thus, there was obtained a homogeneous and stable emulsion having a low viscosity, a pH of 7.5 and a resin content of 20%.

In the same way as described in Example 1, a film was prepared from the emulsion and it had the following mechanical properties:

| 100% modulus | Tensile strength | Elongation |
|---|---|---|
| 42 kg/cm² | 291 kg/cm² | 520% |

The embodiments of the invention in which an exclusive property or privilege is claimed are defined as follows:

1. A process for preparing an aqueous anionic thermosetting polyurethane emulsion, which comprises:
   1. reacting, in the liquid phase and in a ketone solvent, at a temperature of from −20° C to +70° C, (A) isocyanateterminated urethane prepolymer prepared by reacting organic polyhydroxyl component having a molecular weight in the range of from 200 to 10,000 with an excess of organic polyisocyanate, with (B) an excess of polyalkylene polyamine having at least two primary or secondary amino groups, the total mole number of primary and secondary amino groups in the polyalkylene polyamine being greater than the total mole number of isocyanate groups in the isocyanate-terminated urethane prepolymer, the reaction being carried out until the presence of —NCO groups cannot be detected, whereby to form polyurethane-urea-polyamine,
   2. reacting, in the liquid phase, the reaction product of step 1 with a blocked polyisocyanate having a single free isocyanate group in the molecule, at a temperature of −20° C to +70° C, for about 0.5 to 2 hours,
   3. reacting the product of step 2, in the liquid phase, at a temperature of from 5° to 70° C, for from about 0.5 to 2 hours, with a cyclic dicarboxylic acid anhydride,
   4. adding to the reaction product of step 3, an aqueous solution of a base to adjust the pH of the product of step 3 to be in the range of about 6 to about 9, and
   5. treating the product of step 4 to remove the organic solvent therefrom and thereby obtaining an aqueous anionic polurethane emulsion as a final product.

2. A process according to claim 1, in which the reactant (B) includes up to 50 percent, by molecular equivalent, of diamines, or alkylene oxide adducts, acrylonitrile adducts or acrylate adducts of diamines.

3. A process according to claim 1, in which the ratio of (b) the total mole number of amino groups containing active hydrogen atoms in the polyalkylene polyamine, to (a) the total mole number of isocyanate groups in said urethane prepolymer is in the range of 1<b/a ≦ 5.

4. A process according to claim 1, in which said polyalkylene polyamine has the formula

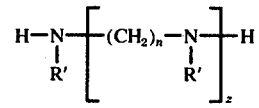

wherein n is an integer larger than one, z is an integer from 2 to 4 and R' is hydrogen, alkyl having one to 4 carbon atoms or hydroxyalkyl having one to 4 carbon atoms.

5. A process according to claim 1, in which said cyclic dicarboxylic acid anhydride is selected from the group consisting of maleic anhydride, succinic anhydride, phthalic anhydride, dihydrophthalic anhydride, tetrahydrophthalic anhydride, hexahydrophthalic anhydride, trimellitic anhydride and itaconic anhydride.

6. A process according to claim 1, in which said base is selected from the group consisting of alkali metal hydroxides, carbonates and bicarbonates, ammonia and watersoluble amines of the formulas RNH₂, R₂NH and R₃N, wherein R is alkyl of one to 4 carbon atoms, hydroxyethyl or hydroxypropyl.

7. An aqueous anionic polyurethane emulsion prepared by the process of claim 1.

8. A polyurethane molded product prepared by forming the emulsion of claim 7 into a molded product and then heattreating the product to effect crosslinking.

* * * * *